US012451031B1

(12) United States Patent
Newman

(10) Patent No.: US 12,451,031 B1
(45) Date of Patent: Oct. 21, 2025

(54) SIGN INSTALLATION TOOLS AND METHODS OF USE

(71) Applicant: KDN Videoworks Inc., Madisin Heights, MI (US)

(72) Inventor: David R. Newman, Royal Oak, MI (US)

(73) Assignee: KDN Videoworks Inc., Madison Heights, MI (US)

( * ) Notice: Subject to any disclaimer, the term of this patent is extended or adjusted under 35 U.S.C. 154(b) by 0 days.

(21) Appl. No.: 19/077,339

(22) Filed: Mar. 12, 2025

(51) Int. Cl.
*G09F 7/18* (2006.01)

(52) U.S. Cl.
CPC ........ *G09F 7/18* (2013.01); *G09F 2007/1852* (2013.01)

(58) Field of Classification Search
CPC ........................... G09F 2007/1852; G09F 7/18
See application file for complete search history.

(56) References Cited

U.S. PATENT DOCUMENTS

D257,212 S * 10/1980 Parker ................................ D8/1
5,181,335 A * 1/1993 Todd ......................... G09F 7/18 40/611.12
5,375,801 A * 12/1994 Porter ..................... E01F 9/631 248/156
5,458,428 A * 10/1995 West ......................... E04C 3/30 403/252
9,542,871 B1 * 1/2017 White ................. G09F 15/0056
12,046,161 B1 * 7/2024 Newman ............... G09F 19/228
2014/0021326 A1 * 1/2014 Mora Vera .............. G09F 19/22 248/634
2015/0076312 A1 * 3/2015 Angvall ............... F16M 11/046 211/162
2018/0131313 A1 * 5/2018 Powell ................. G08G 1/0955
2021/0370451 A1 * 12/2021 Lopez ........................ G09F 7/18
2025/0087118 A1 * 3/2025 McLaren .................. G09F 7/10

* cited by examiner

*Primary Examiner* — David R Dunn
*Assistant Examiner* — Christopher E Veraa
(74) *Attorney, Agent, or Firm* — MacMillan, Sobanski & Todd, LLC

(57) ABSTRACT

Sign installation tools are described. A sign installation tool includes a first frame and an installation assembly. The first frame has a first elongate member and a second elongate member. The installation assembly is moveable between a first position and a second position. The installation assembly has a first housing, a second housing, a second frame, a bracket, and a first magnet. The first housing is slidably disposed on the first elongate member. The second housing is slidably disposed the second elongate member. The second frame is attached to the first housing and the second housing. The bracket is attached to the second frame. The first bracket magnet is attached to the bracket.

20 Claims, 16 Drawing Sheets

SIGN INSTALLATION TOOLS AND METHODS OF USE

FIELD

The disclosure relates to the field of installation tools. More particularly, the disclosure relates to sign installation tools and methods of use.

BACKGROUND

The installation of signs, whether for advertising, informational, directional, or political purposes, is a common practice amongst many individuals and businesses. Traditional methods of sign installation often involve an individual forcing a portion of the sign into the ground by hand, which can be difficult and result in damage to the sign if done incorrectly. For example, if the ground is made of a hard material, such as clay, it may be difficult to install a sign by hand and may require the use of tools, such as a hammer. This increases the time and materials required to install the sign.

A need exists, therefore, for new and useful sign installation tools and methods of using a sign installation tool.

BRIEF SUMMARY OF SELECTED EXAMPLES

Various example sign installation tools and methods of using a sign installation tool are described.

An example sign installation tool includes a first frame and an installation assembly. The first frame has a first elongate member and a second elongate member. The installation assembly is moveable between a first position and a second position. The installation assembly has a first housing, a second housing, a second frame, a bracket, and a first magnet. The first housing is slidably disposed on the first elongate member. The second housing is slidably disposed the second elongate member. The second frame is attached to the first housing and the second housing. The bracket is attached to the second frame. The first bracket magnet is attached to the bracket.

Additional understanding of these examples can be obtained by review of the detailed description, below, and the appended drawings.

DETAILED DESCRIPTION OF SELECTED EXAMPLES

Figure 1:
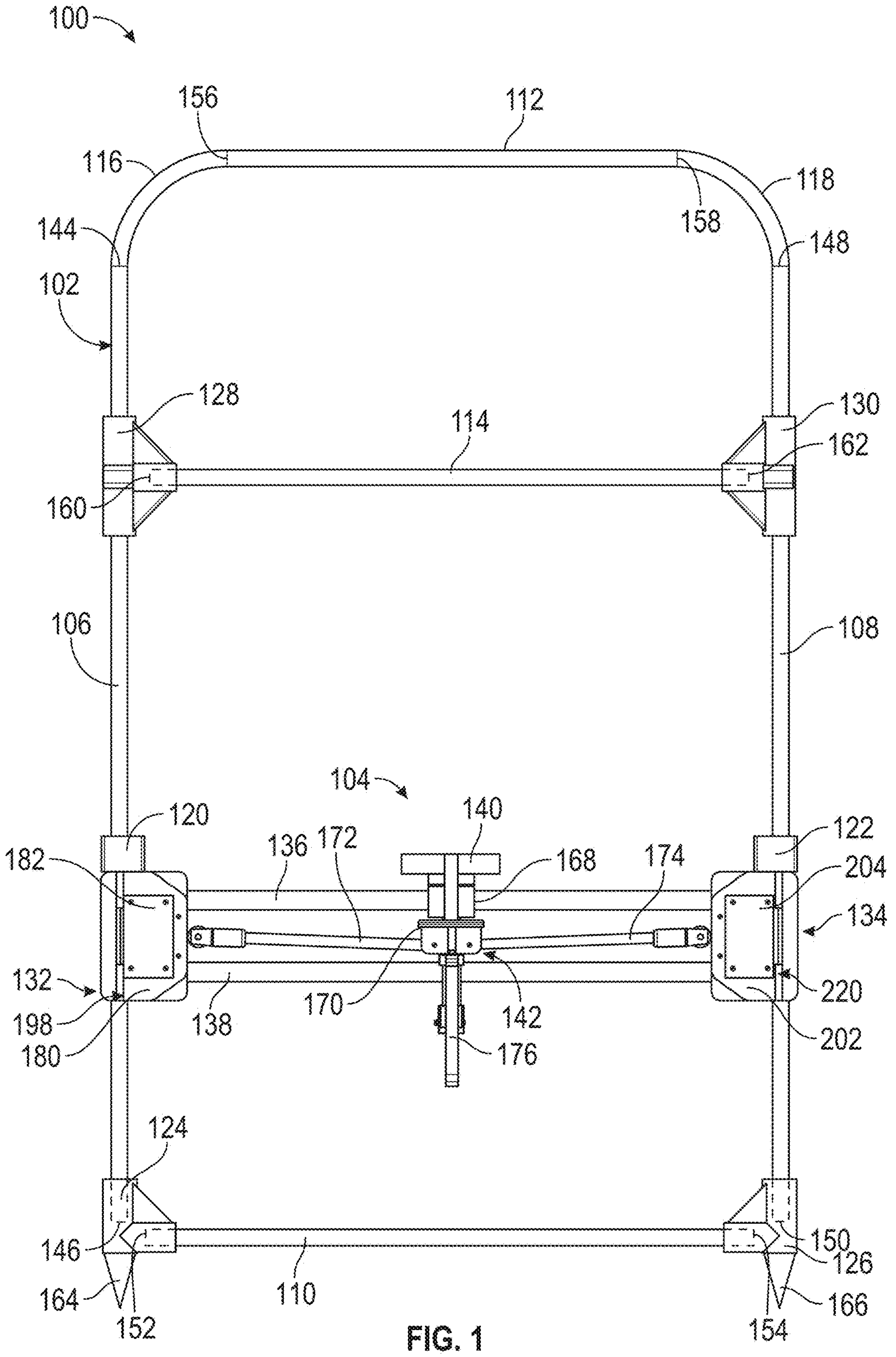
FIG. 1 is a front view of a first example sign installation tool. The installation assembly is shown in a first position. The first brake assembly and the second brake assembly are shown in the locked position. The locking member is shown in the second position. The brake release is shown in the first position.

The following detailed description and the appended drawings describe and illustrate various example sign installation tools and methods of using a sign installation tool. The description and illustration of these examples are provided to enable one skilled in the art to make and use a sign installation tool and to practice a method of installation a sign using a sign installation tool. They are not intended to limit the scope of the claims in any manner.

FIGS. 1 through 10 illustrates a first example sign installation tool 100. The sign installation tool 100 has a frame 102 and an installation assembly 104. The illustrated installation assembly 104 has a first brake assembly 132, a second brake assembly 134, a first support member 136, a second support member 138, a step 140, and a locking member 142.

The frame 102 has a first elongate member 106, a second elongate member 108, a third elongate member 110, a fourth elongate member 112, a fifth elongate member 114, a first connector 116, a second connector 118, a first brake assembly first stop 120, a second brake assembly first stop 122, a first brake assembly second stop 124, a second brake assembly second stop 126, a first t-connector 128, and a second t-connector 130.

The first elongate member 106 has a first elongate member first end 144 and a first elongate member second end 146. The second elongate member 108 has a second elongate member first end 148 and a second elongate member second end 150. The third elongate member 110 has a third elongate member first end 152 and a third elongate member second end 154. The fourth elongate member 112 has a fourth elongate member first end 156 and a fourth elongate member second end 158. The first elongate member first end 144 is connected to the fourth elongate member first end 156 by the first connector 116. The fourth elongate member second end 158 is connected to the second elongate member first end 148 by the second connector 118.

The first elongate member second end 146 is connected to the third elongate member first end 152 by the first brake assembly second stop 124. The second elongate member second end 150 is connected to the third elongate member second end 154 by the second brake assembly second stop 126. The first elongate member 106 is parallel to the second elongate member 108, and the third elongate member 110 is parallel to the fourth elongate member 112 and the fifth elongate member 114. In alternative embodiments, a frame does not have to include a first connector, a second connector, a third elongate member, a fourth elongate member, a fifth elongate member, a first brake assembly first stop, a second brake assembly first stop, a first brake assembly second stop, and/or a second brake assembly second stop. For example, a frame can be a single unitary piece of material that includes some, or all, of these components.

The first brake assembly first stop 120 is disposed on the first elongate member 106 between the first elongate member first end 144 and the first brake assembly 132 and the second brake assembly first stop 122 is disposed on the second elongate member 108 between the second elongate member first end 148 and the second brake assembly 134. In the illustrated embodiment, the first brake assembly first stop 120 is disposed closer to the first elongate member second end 146 than the first elongate member first end 144 and the second brake assembly first stop 122 is disposed closer to the second elongate member second end 150 than the second elongate member first end 148.

The first t-connector 128 is disposed on the first elongate member 106. The second t-connector 130 is disposed on the second elongate member 108. The first t-connector 128 is disposed on the first elongate member 106 between the first elongate member first end 144 and the first brake assembly first stop 120. The second t-connector 130 is disposed on the second elongate member 108 between the second elongate member first end 148 and the second brake assembly first stop 122.

The fifth elongate member 114 has a fifth elongate member first end 160 and a fifth elongate member second end 162. The fifth elongate member first end 160 is disposed within an opening of the first t-connector 128 and the fifth elongate member second end 162 is disposed within an opening of the second t-connector 130. The fifth elongate member 114 can have a variety of uses including, but not limited to, providing additional support to the frame 102 and providing an effective means for carrying the sign installation tool 100.

In the embodiment shown, the frame 102 has a first ground stake 164 attached to the first elongate member second end 146 and a second ground stake 166 attached to the second elongate member second end 150. In the illustrated embodiment, the first ground stake 164 is a component of the first brake assembly second stop 124 and the second ground stake 166 is a component of the second brake assembly second stop 126. The first ground stake 164 and the second ground stake 166 provide a mechanism for securing the sign installation tool 100 to a surface during installation of a sign.

As shown in FIGS. 3 through 9, the installation assembly 104 has the first brake assembly 132, the second brake assembly 134, the first support member 136, the second support member 138, the step 140, and the locking member 142.

Figure 2:
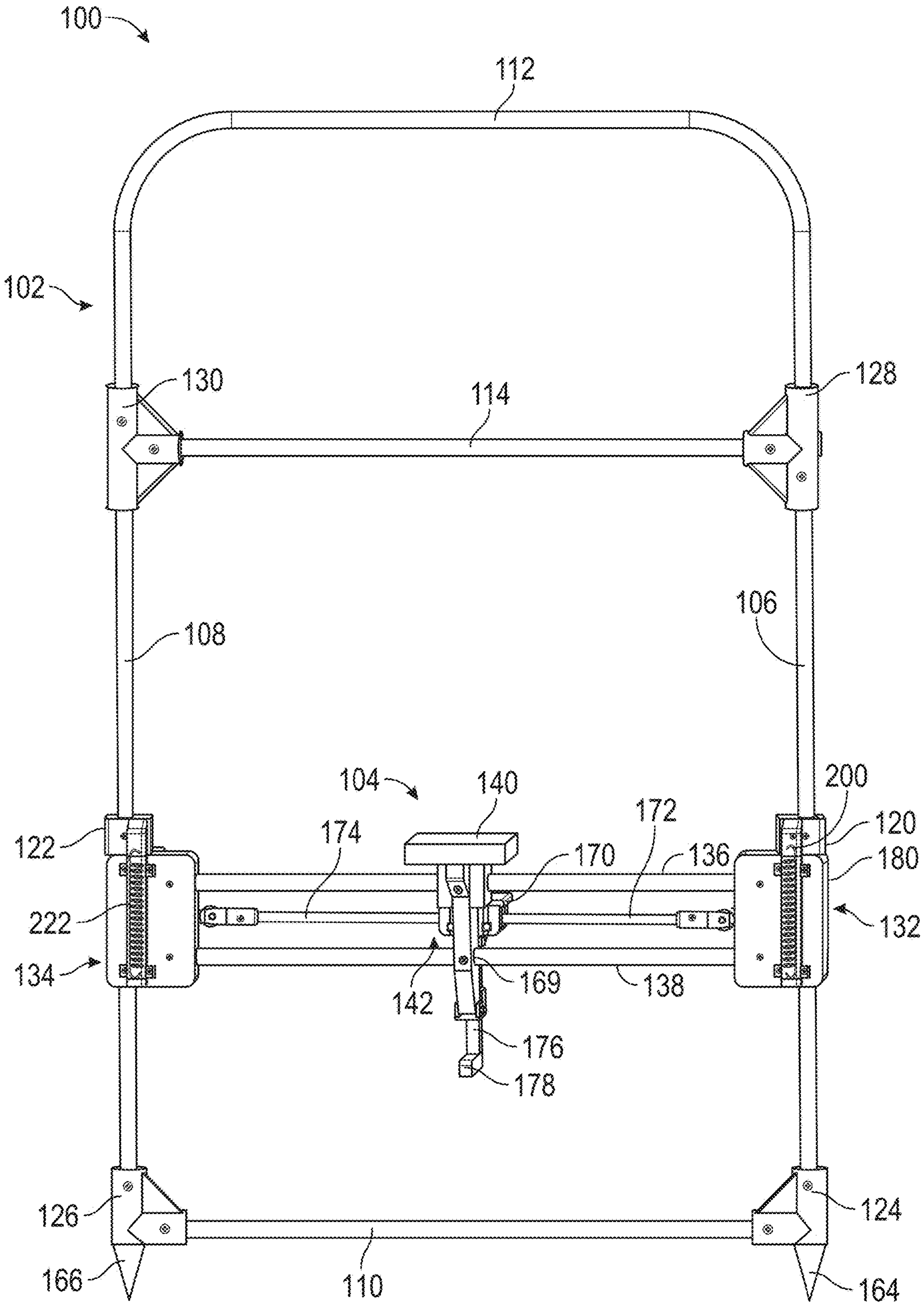
FIG. 2 is a rear view of the sign installation tool shown in FIG. 1.
Figure 3:
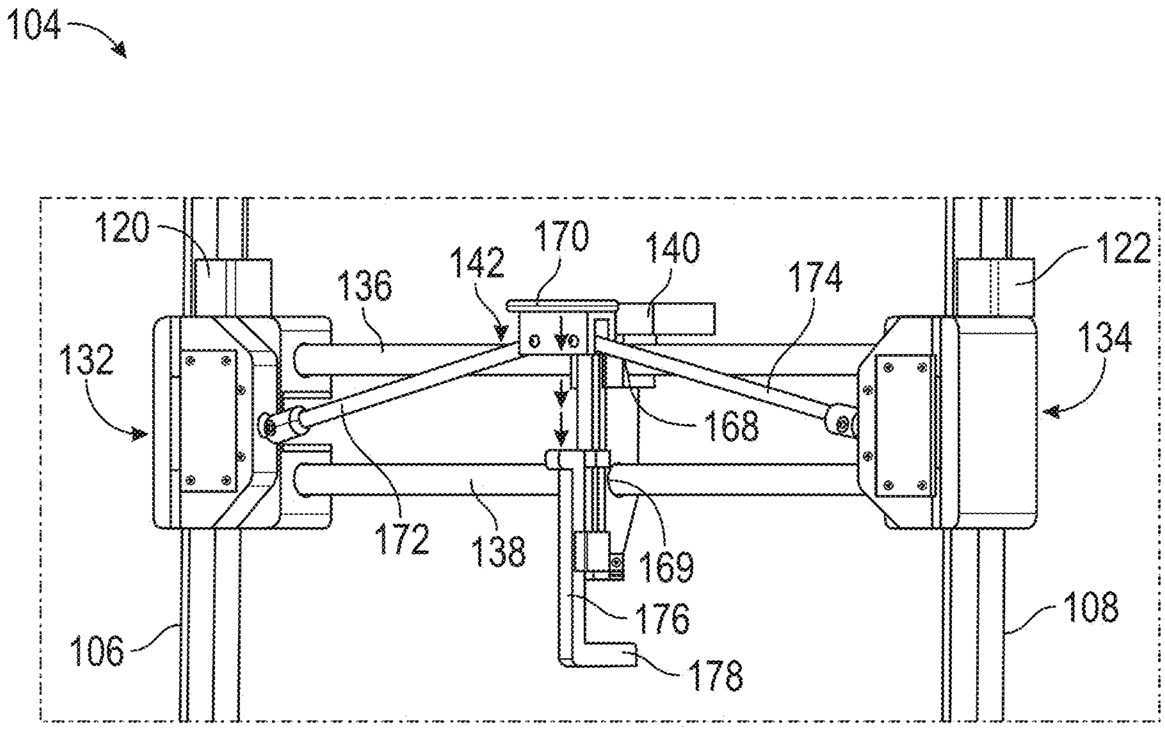
FIG. 3 is a partial perspective view of the sign installation tool shown in FIG. 1. The first brake assembly and the second brake assembly are shown in the unlocked position. The locking member is shown in the second position. The brake release is shown in the first position. A sign is shown partially disposed within the installation assembly.
Figure 4:
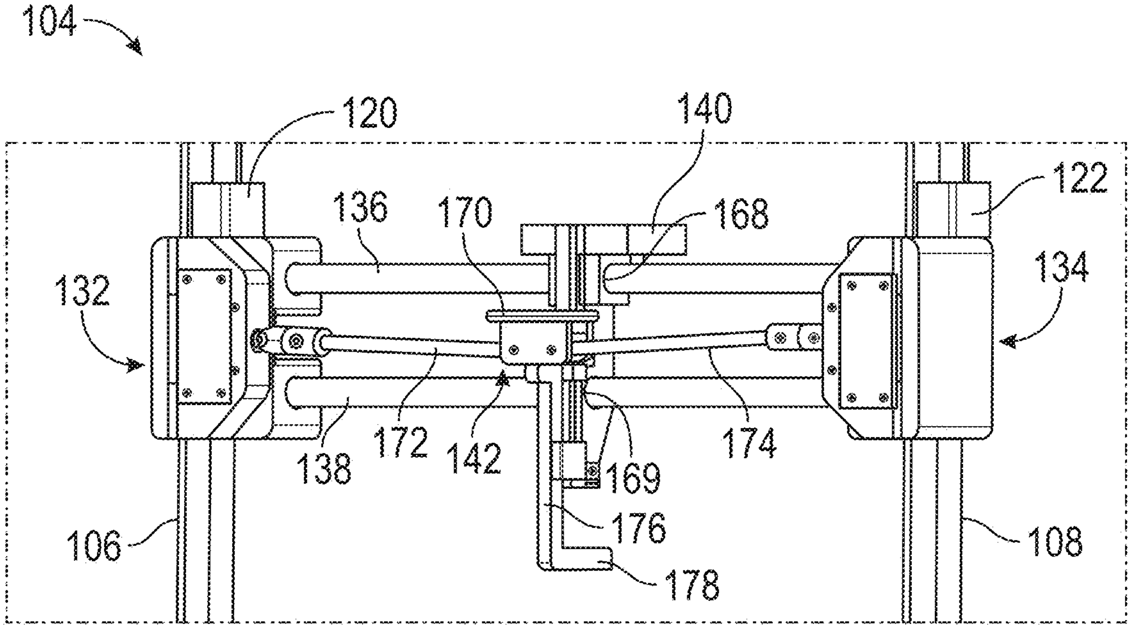
FIG. 4 is a partial perspective view of the sign installation tool shown in FIG. 1. A sign is shown partially disposed within the installation assembly.
Figure 5:
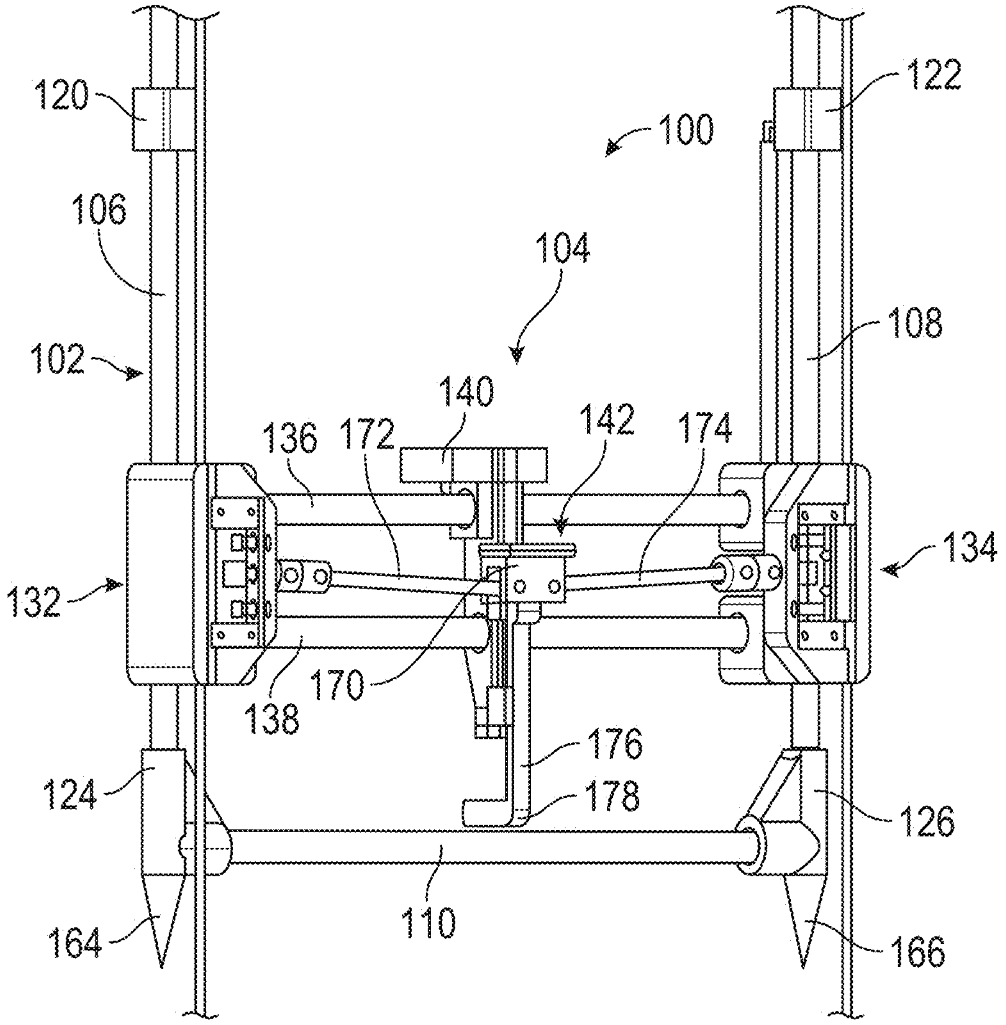
FIG. 5 is a partial perspective view of the sign installation tool shown in FIG. 1. A sign is shown partially disposed within the installation assembly. The installation assembly is shown in a second position. A portion of the housing of each of the first brake assembly and the second brake assembly have been removed for clarity.
Figure 6:
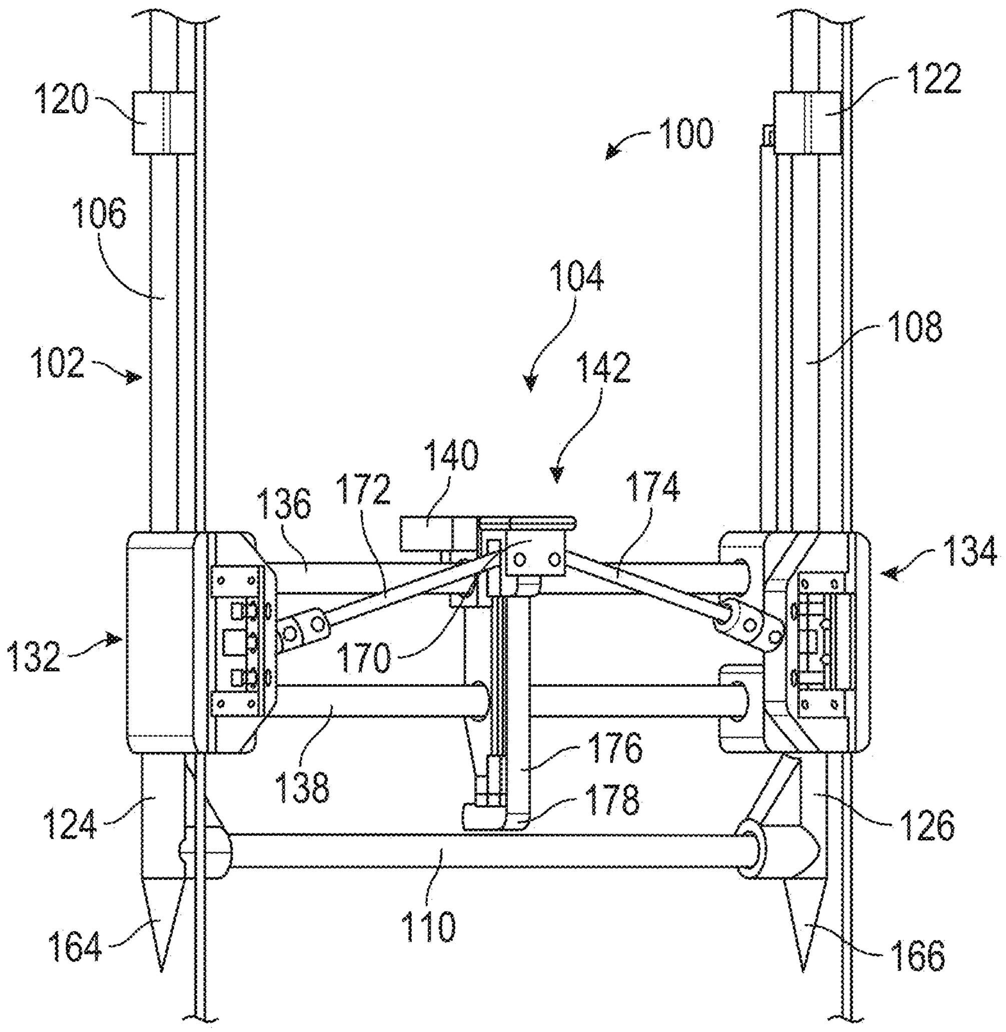
FIG. 6 is a partial perspective view of the sign installation tool shown in FIG. 1. The first brake assembly and the second brake assembly are shown in the unlocked position. The locking member is shown in the first position. The brake release is shown in the second position. The installation assembly is shown in a third position. A portion of the housing of each of the first brake assembly and the second brake assembly have been removed for clarity.
Figure 7:
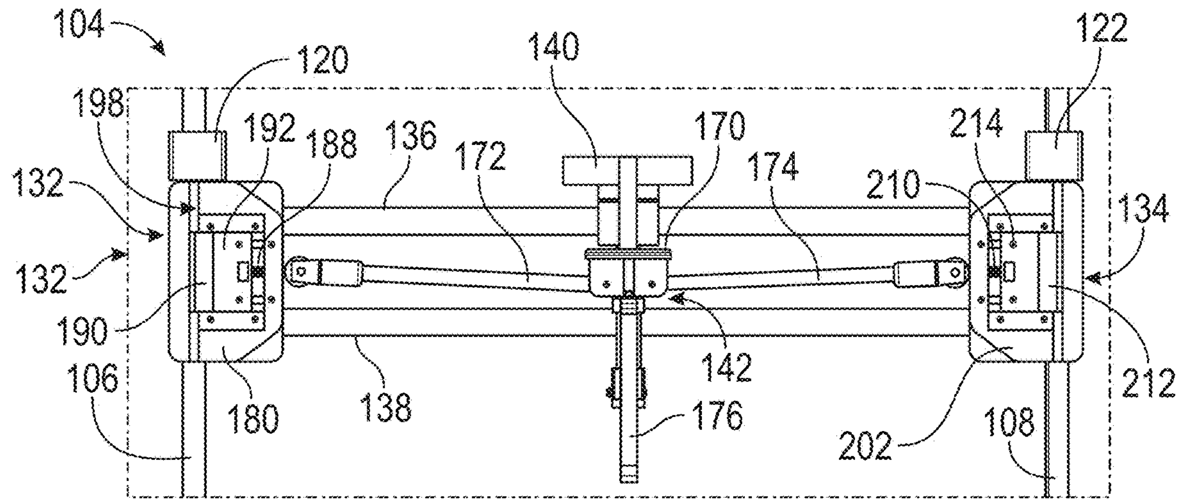
FIG. 7 is a partial front view of the sign installation tool shown in FIG. 1. A portion of the housing of each of the first brake assembly and the second brake assembly have been removed for clarity.
Figure 8:
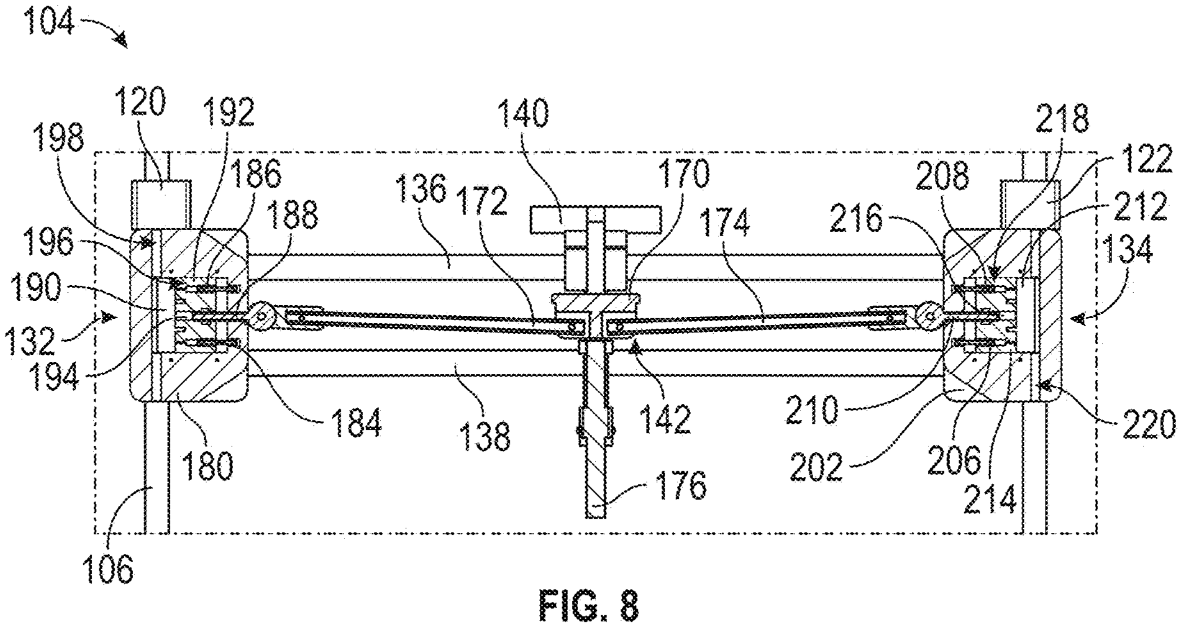
FIG. 8 is a partial sectional front view of the sign installation tool shown in FIG. 1.
Figure 9:
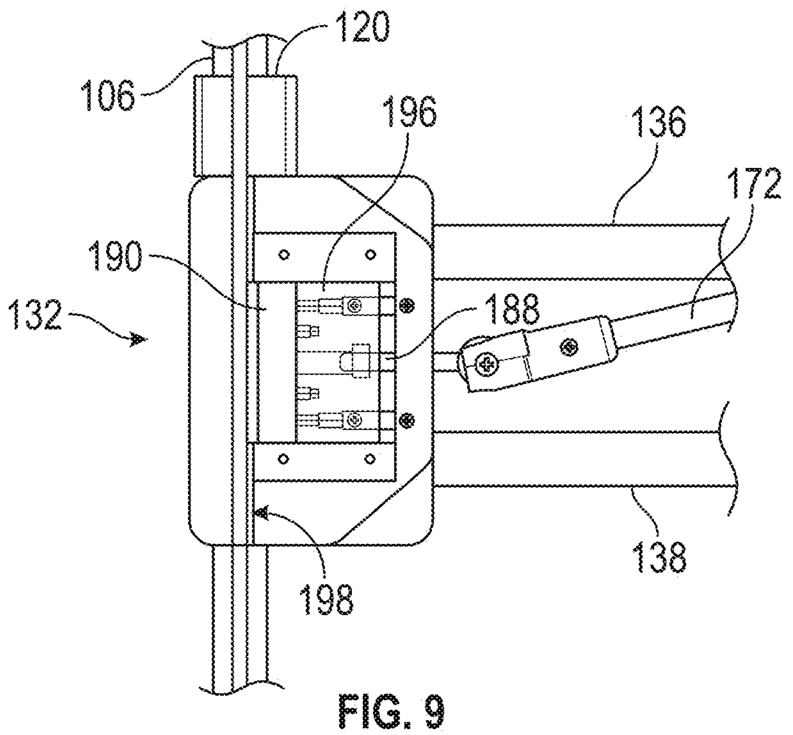
FIG. 9 is a partial view of the sign installation tool shown in FIG. 1. A portion of the housing of the first brake assembly has been removed for clarity. The locking member is in the first position.

The first brake assembly 132 is slidably disposed on the first elongate member 106. The first brake assembly 132 is moveable between an unlocked position, as shown in FIGS. 3, 6, and 9, and a locked position, as shown in FIGS. 1, 2, 4, 5, 7, 8, and 10. The second brake assembly 134 is slidably disposed on the second elongate member 108. The second brake assembly 134 is moveable between an unlocked position, as shown in FIGS. 3 and 6, and a locked position, as shown in FIGS. 1, 2, 4, 5, 7, and 8. The first support member 136 extends from the first brake assembly 132 to the second brake assembly 134. The second support member 138 extends from the first brake assembly 132 to the second brake assembly 134 and is parallel to the first support member 136. However, in alternative embodiments, a second support member can be omitted from an installation assembly.

The step 140 is disposed on the first support member 136 and the second support member 138. In the embodiment shown, the step 140 defines a first support member passageway 168 and a second support member passageway 169. The first support member 136 is disposed through the first support member passageway 168 and the second support member 138 is disposed through the second support member passageway 169. In alternative embodiments, a step can be disposed on one or more support members and/or define any suitable number of support member passageways.

The locking member 142 is attached to the first brake assembly 132 and the second brake assembly 134. The locking member 142 is moveable between a first position, as shown in FIGS. 3, 6, and 9, and a second position, as shown in FIGS. 1, 2, 4, 5, 7, 8, and 10. The first brake assembly 132 and the second brake assembly 134 are in the unlocked position when the locking member 142 is in the first position and are in the locked position when the locking member 142 is in a second position. The locking member 142 is pivotably attached to the first brake assembly 132 and the second brake assembly 134. The illustrated locking member 142 has a base 170, a first shaft 172, and a second shaft 174. The base 170 is slidably disposed on the step 140. The first shaft 172 is pivotably attached to the base 170 and pivotably attached to the first brake assembly 132. The second shaft 174 is pivotably attached to the base 170 and pivotably attached to the second brake assembly 134.

In the illustrated embodiment, the installation assembly 104 includes a brake release 176 that is slidably disposed on the step 140. The brake release 176 is moveable between a first position and a second position. The first brake assembly 132 and the second brake assembly 134 are in the locked position when the brake release 176 is in the first position and the locking member 142 is in the second position. The first brake assembly 132 and the second brake assembly 134 are in the unlocked position when the brake release 176 is in the second position and the locking member 142 is in the first position. The brake release 176 is free of contact with the locking member 142 when the locking member 142 is in the first position and the brake release 176 is in the first position. The brake release 176 contacts the locking member 142 when the locking member 142 is in the second position. The brake release 176 includes a projection 178 that is free of contact with the step 140 when the brake release 176 is in the first position and contacts the step 140 when the brake release 176 is in the second position. When the installation assembly 104 is in the third position, the brake release 176 contacts the third elongate member 110 and is prevented from moving away from the locking member 142. This structural arrangement allows the brake release 176 to move the locking member 142 from the second position to the first position. Alternatively, a third elongate member could be omitted and a brake release could contact the surface to which a sign is being installed (e.g., ground) to accomplish moving a locking member from a second position to a first position.

Figure 10:
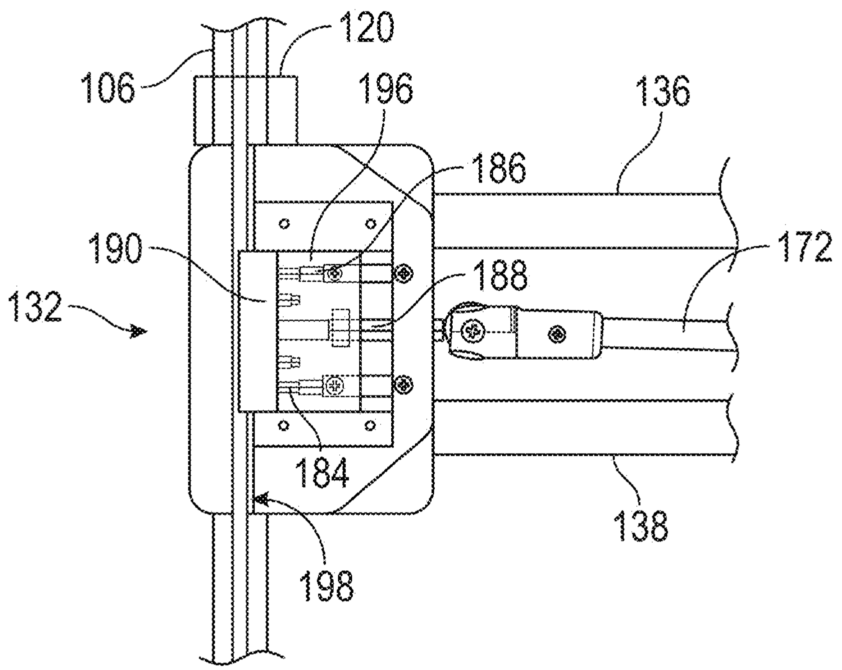
FIG. 10 is a partial view of the sign installation tool shown in FIG. 1. A portion of the housing of the first brake assembly has been removed for clarity. The locking member is in the second position.

FIGS. 1 and 7 through 10 illustrate the first brake assembly 132 and the second brake assembly 134 in more detail. In the illustrated embodiment, the first brake assembly 132 has a first housing 180, a first housing cover 182, a first brake spring 184, a second brake spring 186, a first push rod 188, a first brake pad 190, and a first brake pad holder 192. The first housing 180 is slidably disposed on the first elongate member 106 and defines a first push rod passageway 194 and a first recess 196. The first push rod 188 is disposed through the first push rod passageway 194. The first push rod 188 is attached to the first shaft 172 of the locking member 142 and the first brake pad holder 192. The first push rod 188, the first brake spring 184, the second brake spring 186, the first brake pad 190, and the first brake pad holder 192 are disposed within the first recess 196. The first brake spring 184 and the second brake spring 186 are attached at one end to a portion of the first housing 180 and at a second end to the first brake pad holder 192. The first brake spring 184 and second brake spring 186 bias the first brake assembly 132 to the unlocked position when the locking member 142 is in the first position. The first brake pad 190 is attached to the first brake pad holder 192. The first housing 180 defines a first sign passageway 198 that is parallel to the first elongate member 106 and the second elongate member 108. The first brake pad 190 is disposed outside the first sign passageway 198 in the first position, as shown in FIG. 9. The first brake pad 190 is disposed within the first sign passageway 198 in the second position, as shown in FIG. 10. The first sign passageway 198 is configured to receive a first portion of a sign, as shown in FIG. 9. As shown in FIG. 2, a first spring 200 is attached to the first brake assembly first stop 120 and the first brake assembly 132. In the embodiment shown, the first spring 200 is attached to the first housing 180 of the first brake assembly 132. The first spring 200 biases the installation assembly 104 in a first position (e.g., adjacent to the first brake assembly first stop 120) until a user is ready to install a sign. The first spring 200 is configured to return the installation assembly 104 to the first position after installation of a sign.

In the illustrated embodiment, the second brake assembly 134 has a second housing 202, a second housing cover 204, a third brake spring 206, a fourth brake spring 208, a second push rod 210, a second brake pad 212, and a second brake pad holder 214. The second housing 202 is slidably disposed on the second elongate member 108 and defines a second push rod passageway 216 and a second recess 218. The second push rod 210 is disposed through the second push rod passageway 216. The second push rod 210 is attached to the second shaft 174 of the locking member 142 and the second brake pad holder 214. The second push rod 210, the third brake spring 206, the fourth brake spring 208, the second brake pad 212, and the second brake pad holder 214 are disposed within the second recess 218. The third brake spring 206 and the fourth brake spring 208 are attached at one end to a portion of the second housing 202 and at a second end to the second brake pad holder 214. The third brake spring 206 and fourth brake spring 208 bias the second brake assembly 134 to the unlocked position when the locking member 142 is in the first position. The second brake pad 212 is attached to the second brake pad holder 214. The second housing 202 defines a second sign passageway 220 that is parallel to the first elongate member 106 and the second elongate member 108. The second brake pad 212 is disposed outside the second sign passageway 220 in the first position, as shown in FIG. 3. The second brake pad 212 is disposed inside the second sign passageway 220 in the second position, as shown in FIG. 1. As shown in FIG. 2, a second spring 222 is attached to the second brake assembly first stop 122 and the second brake assembly 134. The second spring 222 biases the installation assembly 104 in a first position (e.g., adjacent to the second brake assembly first stop 122) until a user is ready to install a sign. The second spring 222 is configured to return the installation assembly 104 to the first position after installation of a sign.

The components of a sign installation tool can be formed using any suitable technique or method of manufacture and using any suitable material. Selection of a suitable technique or method of manufacture and of a suitable material to form a component of a sign installation tool can be based on various considerations, such as the type of sign intended to be installed by a sign installation tool. For example, a first t-connector and a second t-connector of a sign installation tool can be form from a metal, polymers, and any other material considered suitable for a particular embodiment.

Figure 11:
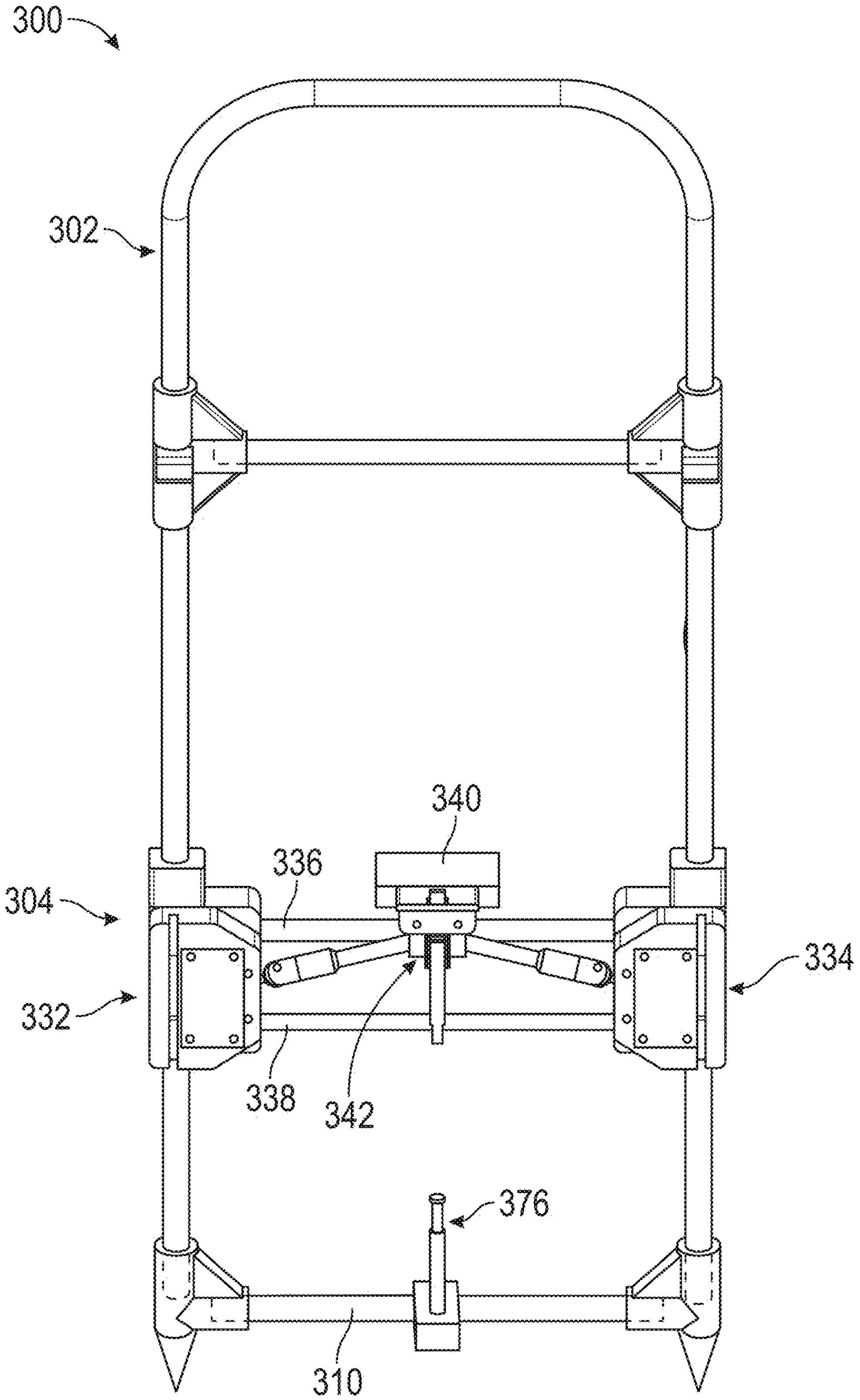
FIG. 11 is a front view of a second example sign installation tool. The installation assembly is shown in a first position. The first brake assembly and the second brake assembly are shown in the unlocked position. The locking member is shown in the first position. The brake release is shown in the first position.
Figure 12:
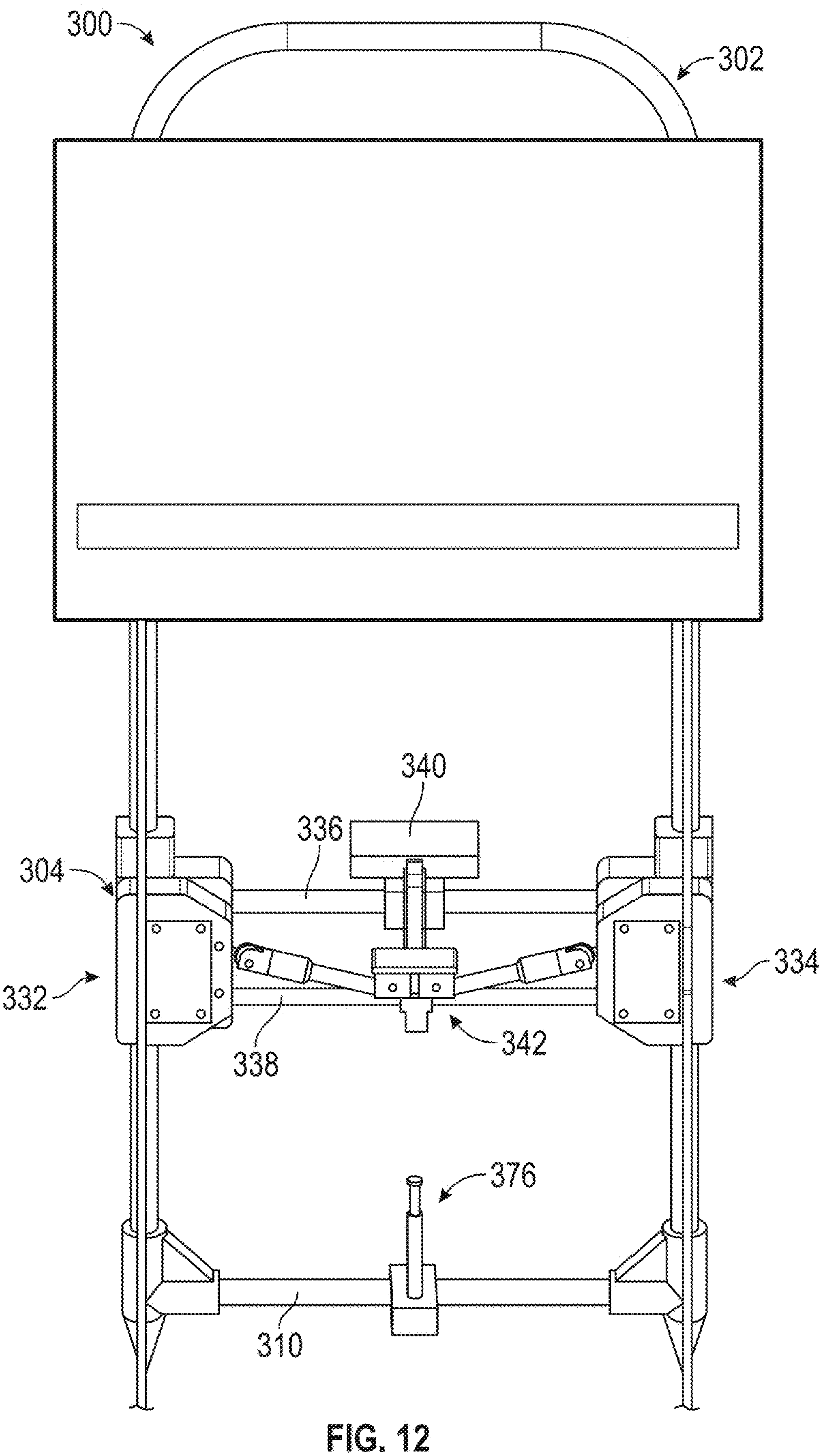
FIG. 12 is a side view of the sign installation tool shown in FIG. 11. The first brake assembly and the second brake assembly are shown in the locked position. The locking member is shown in the second position. The brake release is shown in the first position. A sign is shown partially disposed within the sign installation tool.
Figure 13:
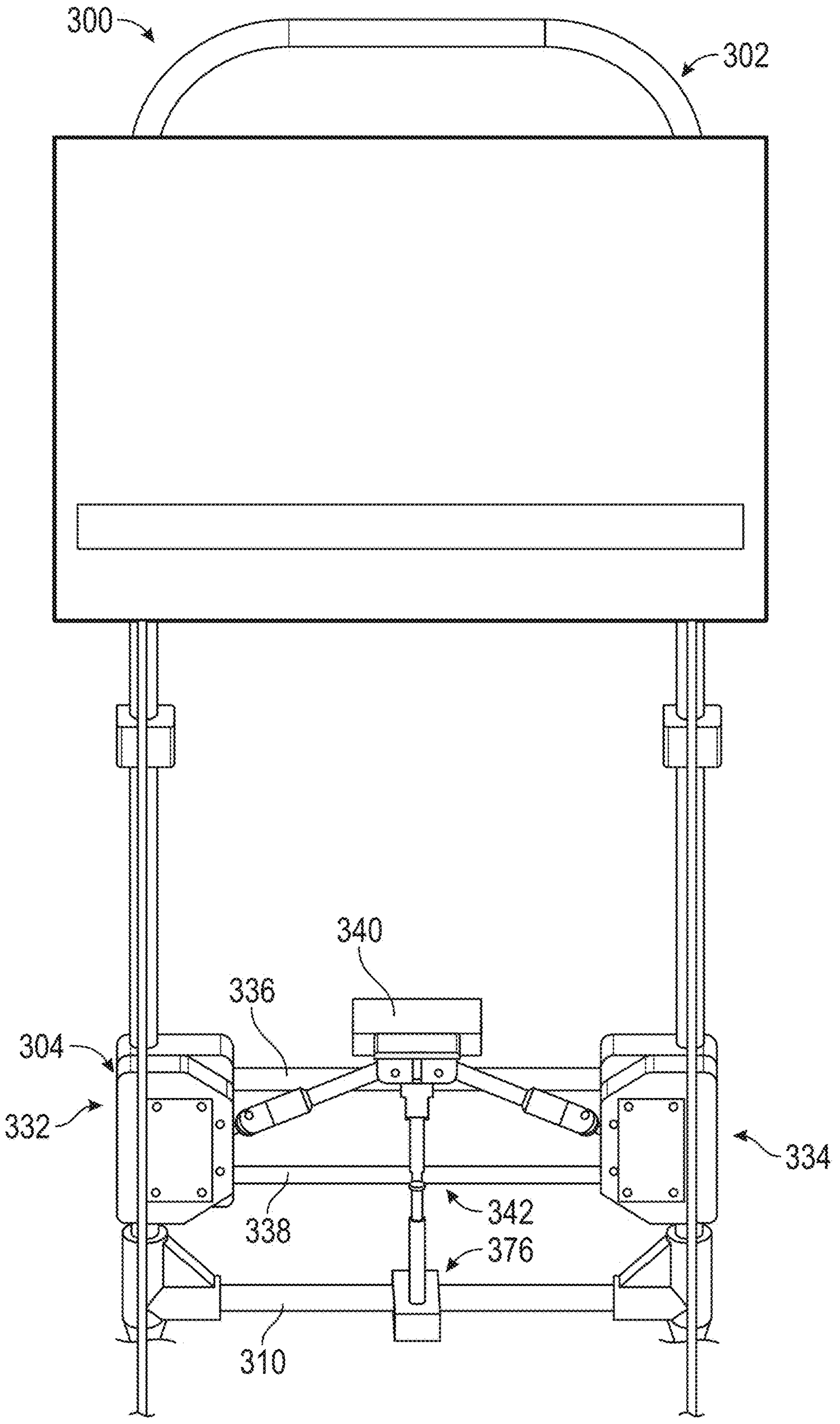
FIG. 13 is a side view of the sign installation tool shown in FIG. 11. The installation assembly is shown in a second position. The first brake assembly and the second brake assembly are shown in the unlocked position. The locking member is shown in the first position. The brake release is shown in the first position. A sign is shown partially disposed within the sign installation tool and in the ground.
Figure 14:
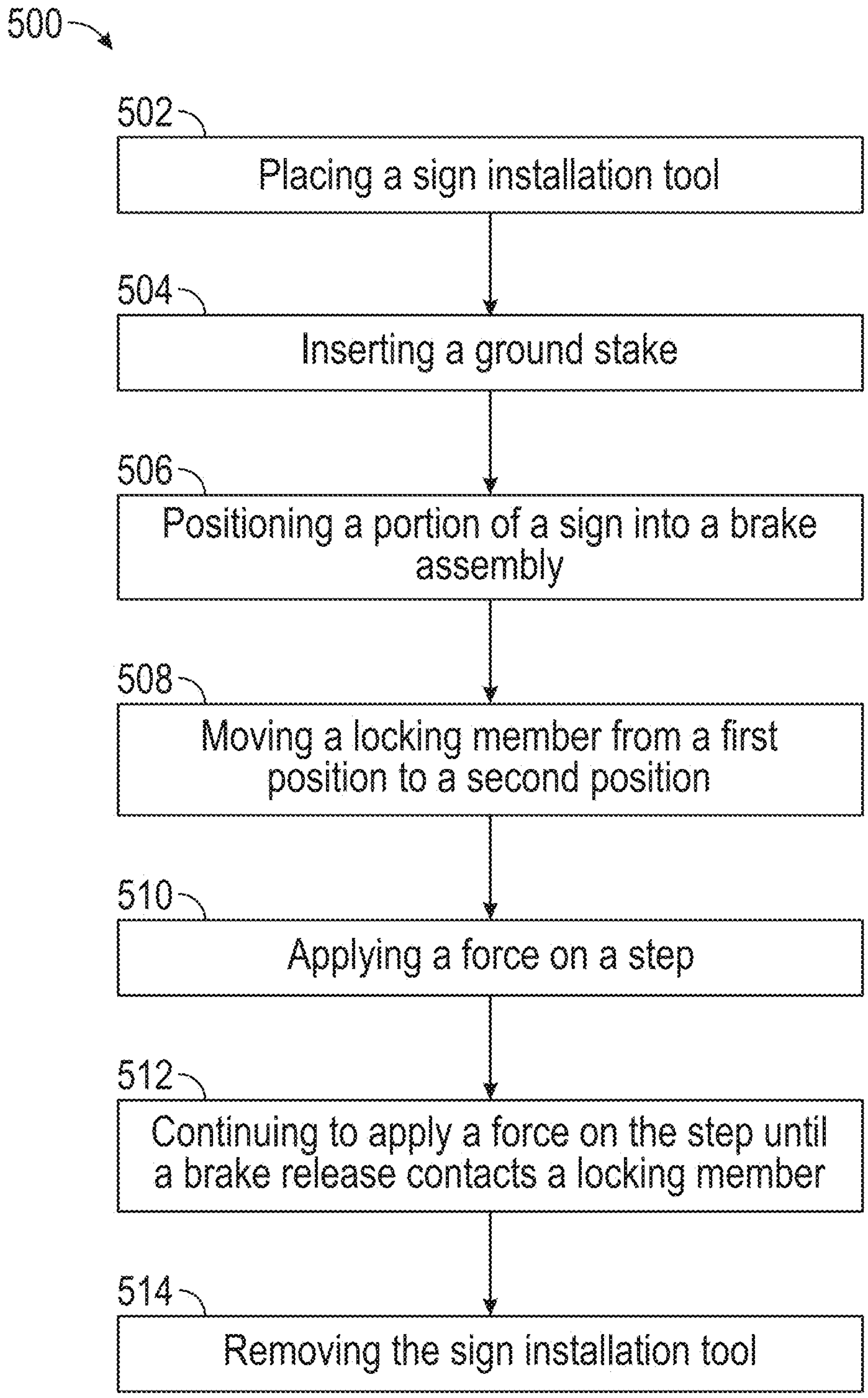
FIG. 14 is a schematic illustration of a method of installing a sign into a surface using a sign installation tool.
Figure 15:
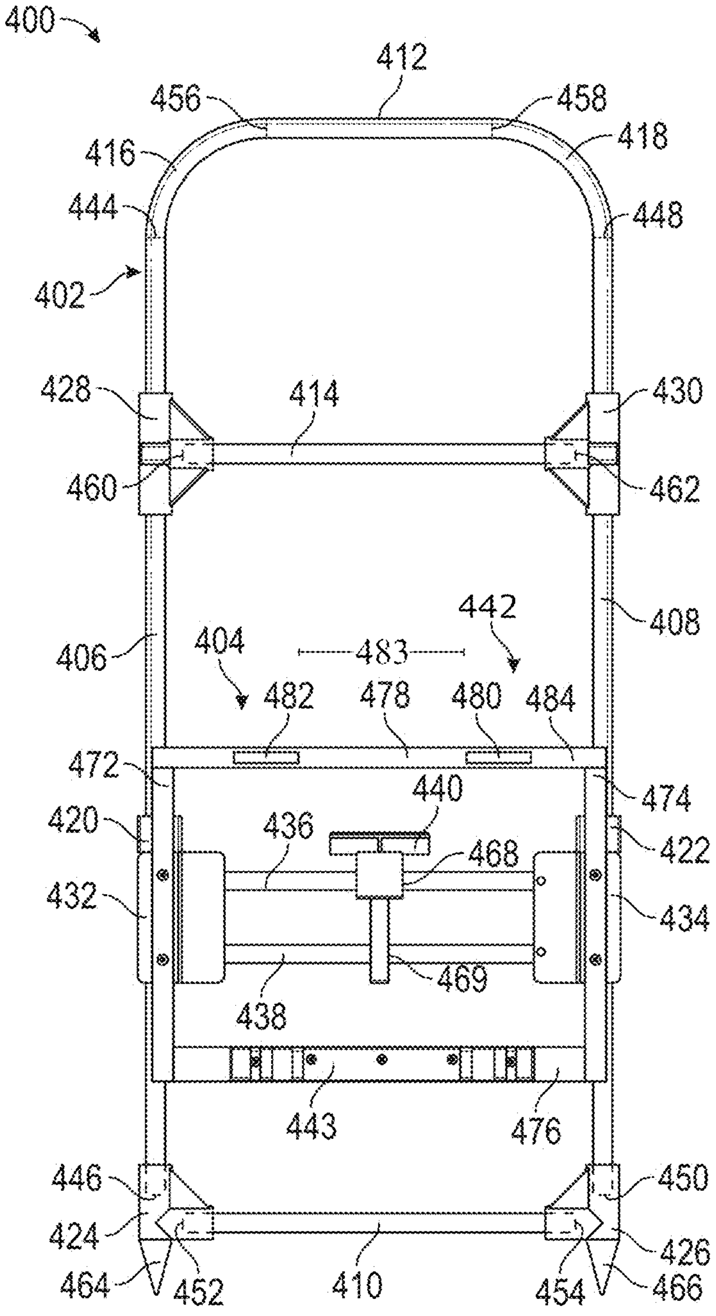
FIG. 15 is a front view of a third example sign installation tool. The installation assembly is shown in a first position.
Figure 16:
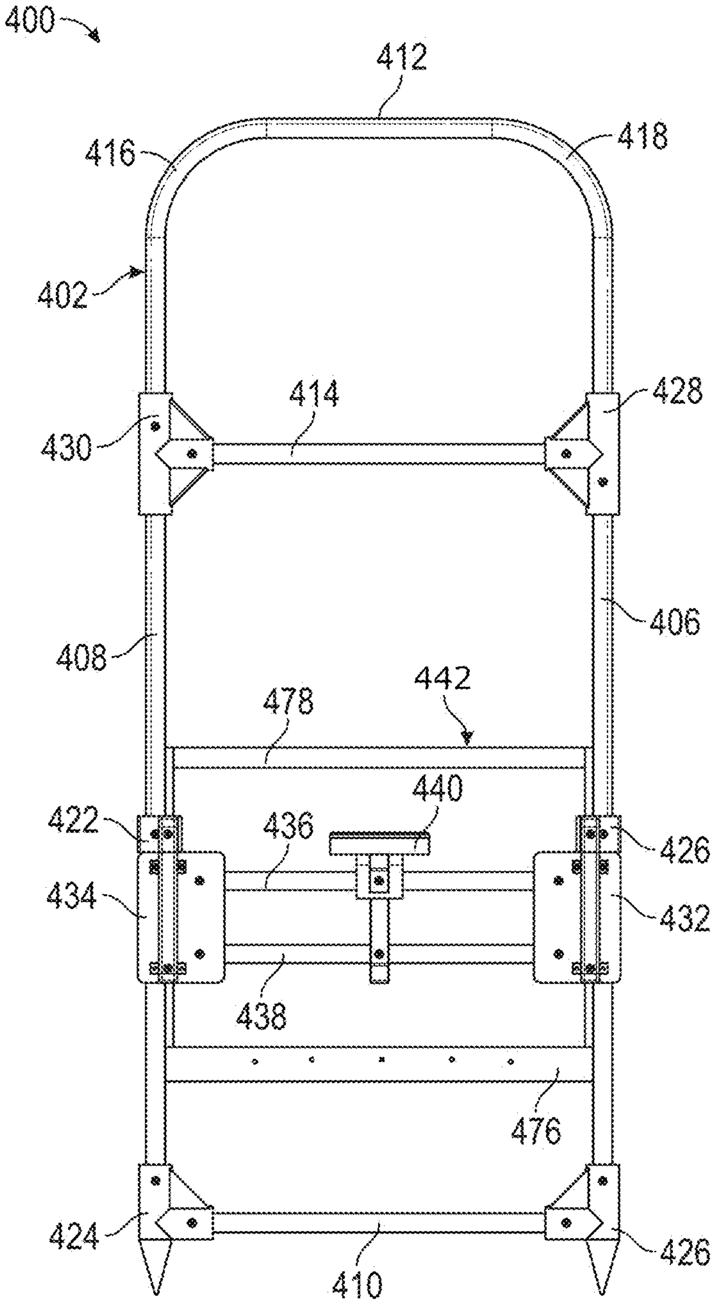
FIG. 16 is a back view of the third example installation tool shown in FIG. 15.
Figure 17:
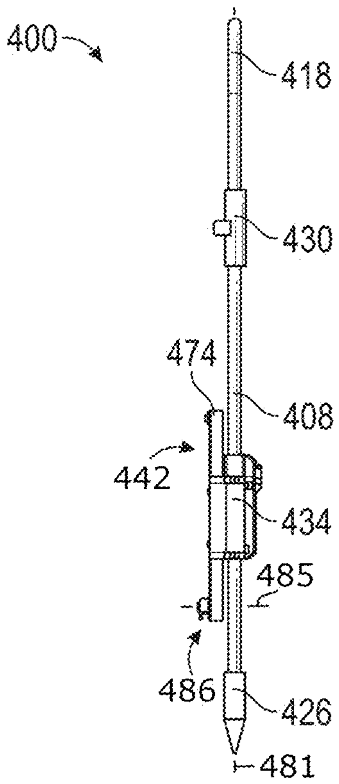
FIG. 17 is a side view of the third example installation tool shown in FIG. 15.
Figure 18:
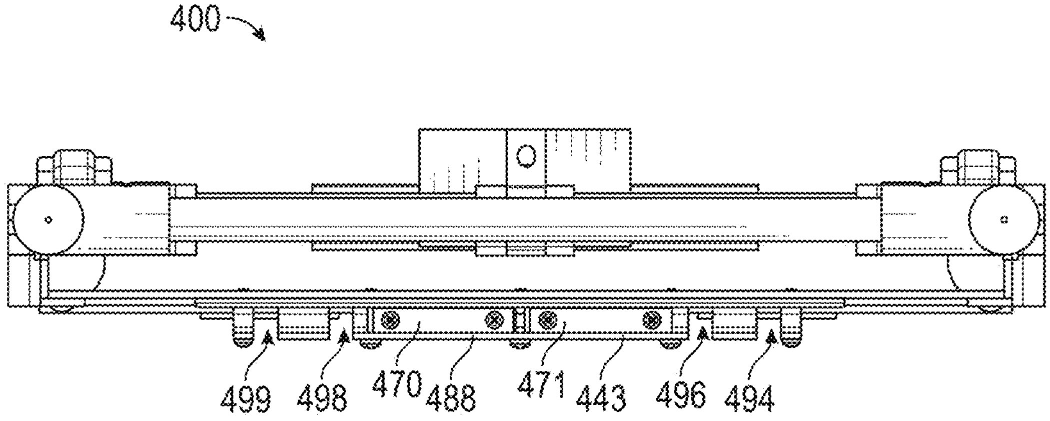
FIG. 18 is a bottom view of the third example installation tool shown in FIG. 15.
Figure 19:
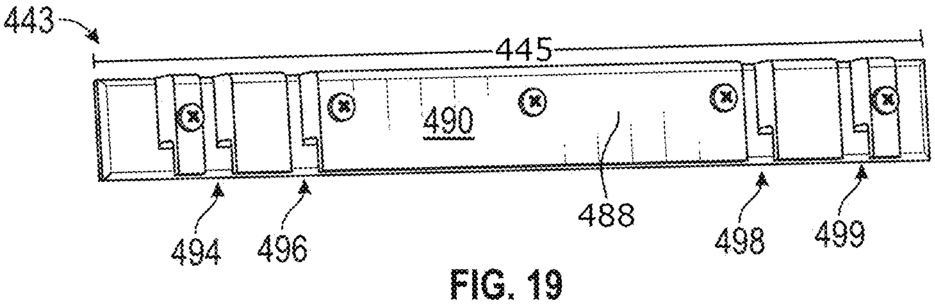
FIG. 19 is a perspective view of the bracket of the third example installation tool shown in FIG. 15.
Figure 20:
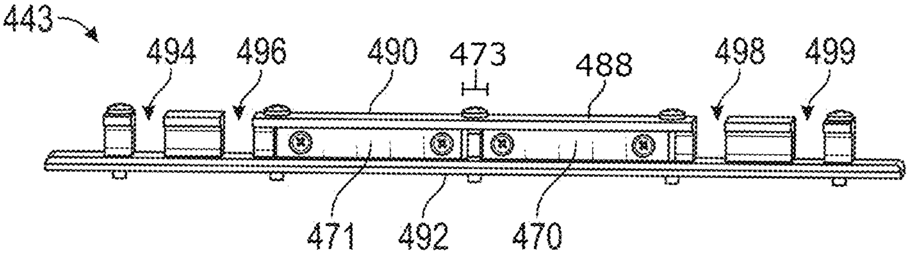
FIG. 20 is a bottom view of the bracket of the third example installation tool shown in FIG. 15.
Figure 21:
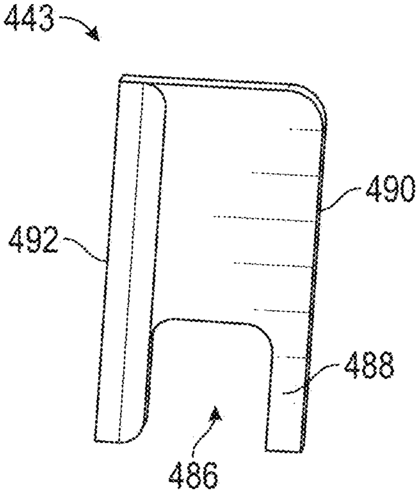
FIG. 21 is a side view of the bracket of the third example installation tool shown in FIG. 15.
Figure 22:
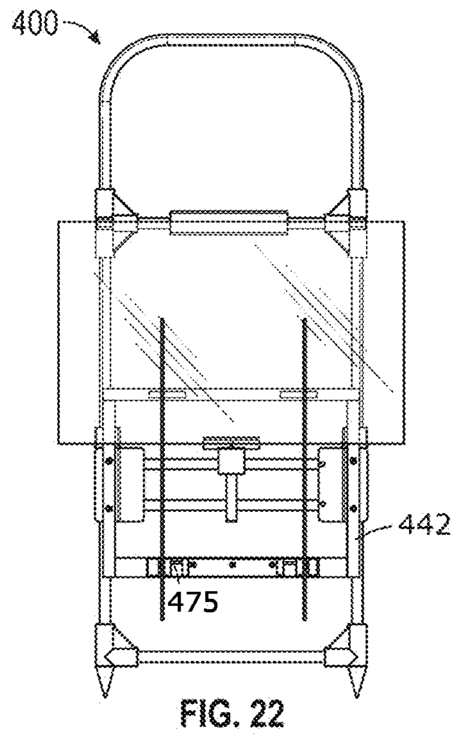
FIG. 22 is a front view of the third example sign installation tool shown in FIG. 15. The installation assembly is shown in a first position with a sign positioned within the installation assembly.

FIGS. 11 through 13 illustrate a second example sign installation tool 300. The sign installation tool 300 is similar to the sign installation tool 300 illustrated in FIGS. 1 through 10 described above, except as detailed below. Components below that lack a reference number are the same elements as described in the first example sign installation tool 100 and function in the same manner as described above.

The sign installation tool 300 has a frame 302 and an installation assembly 304. The illustrated installation assembly 304 has a first brake assembly 332, a second brake assembly 334, a first support member 336, a second support member 338, a step 340, and a locking member 342.

In the illustrated embodiment, the brake release 376 is disposed on the third elongate member 310. The brake release 376 contacts the locking member 342 when the installation assembly 304 is in the second position and the third position. The brake release 376 contacts the locking member 342 when the installation assembly 304 is moved from the first position, as shown in FIG. 11, to the second position. When the installation assembly 304 is moved from the second position to the third position, as shown in FIG. 13, the locking member 342 moves from a locked position to an unlocked position.

Various methods of installing a sign into a surface (e.g., ground) using a sign installation tool, such as an embodiment described herein, are described herein. While these methods are shown and described as a series of actions, it is to be understood and appreciated that the methods are not limited by the order of acts, as some acts may in accordance with these methods, occur in the order shown and/or described, in different orders, concurrently with other acts described herein, and/or be omitted.

Referring to FIGS. 1 through 10, FIG. 14 shown a schematic illustration of a method 500 of installing a sign into a surface using a sign installation tool.

A step 502 includes placing a sign installation tool, such as an embodiment described herein, at a desired location. Another step 504 includes inserting a ground stake, or a first ground stake and a second ground stake, into the surface within which it is desired to install a sign. Another step 506 includes positioning a first portion of a sign (e.g., first leg) into the first brake assembly (e.g., first sign passageway) and a second portion of a sign (e.g., second leg) into the second brake assembly (e.g., second sign passageway). Another step 508 includes moving the locking member from a first position to a second position. Another step 510 includes applying a force (e.g., downward force) on the step to move the installation assembly from the first position to the second position. Another step 512 includes continuing to apply a force (e.g., downward force) on the step until the brake release contacts the locking member and moves the locking member from the second position to the first position. Another step 514 includes removing the sign installation tool from the sign.

Figure 23:
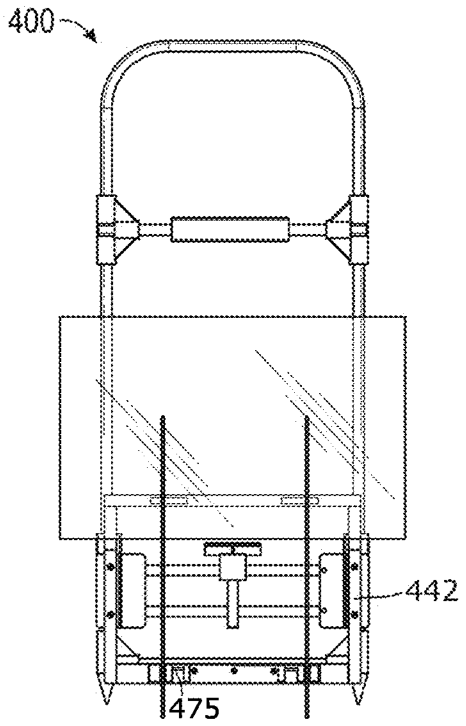
FIG. 23 is a front view of the third example sign installation tool shown in FIG. 15. The installation assembly is shown in a second position with a sign positioned within the installation assembly.

FIGS. 15 through 23 illustrate a third sign installation tool 400. The sign installation tool 400 has a first frame 402 and an installation assembly 404 that is moveable between a first position, as illustrated in FIGS. 15 through 18 and 22, and a second position, as illustrated in FIG. 23.

The first frame 402 has a first elongate member 406, a second elongate member 408, a third elongate member 410, a fourth elongate member 412, a fifth elongate member 414, a first connector 416, a second connector 418, a first housing first stop 420, a second housing first stop 422, a first housing second stop 424, a second housing second stop 426, a first t-connector 428, and a second t-connector 430.

The first elongate member 406 has a first elongate member first end 444 and a first elongate member second end 446. The second elongate member 408 has a second elongate member first end 448 and a second elongate member second end 450. The third elongate member 410 has a third elongate member first end 452 and a third elongate member second end 454. The fourth elongate member 412 has a fourth elongate member first end 456 and a fourth elongate member second end 458. The first elongate member first end 444 is connected to the fourth elongate member first end 456 by the first connector 416. The fourth elongate member second end 458 is connected to the second elongate member first end 448 by the second connector 418.

The first elongate member second end 446 is connected to the third elongate member first end 452 by the first housing second stop 424. The second elongate member second end 450 is connected to the third elongate member second end 454 by the second housing second stop 426. The first elongate member 406 is parallel to the second elongate member 408, and the third elongate member 410 is parallel to the fourth elongate member 412 and the fifth elongate member 414. In alternative embodiments, a first frame does not have to include a first connector, a second connector, a third elongate member, a fourth elongate member, a fifth elongate member, a first housing first stop, a second housing first stop, a first housing second stop, and/or a second housing second stop. For example, a first frame can be a single unitary piece of material that includes some, or all, of these components.

The first housing first stop 420 is disposed on the first elongate member 406 between the first elongate member first end 444 and the first housing 432, and the second housing first stop 422 is disposed on the second elongate member 408 between the second elongate member first end 448 and the second housing 434. In the illustrated embodiment, the first housing first stop 420 is disposed closer to the first elongate member second end 446 than the first elongate member first end 444 and the second housing first stop 422 is disposed closer to the second elongate member second end 450 than the second elongate member first end 448.

The first t-connector 428 is disposed on the first elongate member 406. The second t-connector 430 is disposed on the second elongate member 408. The first t-connector 428 is disposed on the first elongate member 406 between the first elongate member first end 444 and the first housing first stop 420. The second t-connector 430 is disposed on the second elongate member 408 between the second elongate member first end 448 and the second housing first stop 422.

The fifth elongate member 414 has a fifth elongate member first end 460 and a fifth elongate member second end 462. The fifth elongate member first end 460 is disposed within an opening of the first t-connector 428 and the fifth elongate member second end 462 is disposed within an opening of the second t-connector 430. The fifth elongate member 414 can have a variety of uses including, but not limited to, providing additional support to the first frame 402 and providing an effective means for carrying the sign installation tool 400.

In the embodiment shown, the first frame 402 has a first ground stake 464 attached to the first elongate member second end 446 and a second ground stake 466 attached to the second elongate member second end 450. The first ground stake 464 and the second ground stake 466 provide a mechanism for securing the sign installation tool 400 to a surface during installation of a sign.

As shown in FIGS. 15 through 21, the installation assembly 404 has a first housing 432, a second housing 434, a first support member 436, a second support member 438, a step 440, a second frame 442, and a bracket 443. The bracket 443 is shown independent of the sign installation tool 400 in FIGS. 443, illustrated in FIGS. 19 through 21.

The first housing 432 is slidably disposed on the first elongate member 406. The second housing 434 is slidably disposed on the second elongate member 408. The first support member 436 extends from the first housing 432 to the second housing 434. The second support member 438 extends from the first housing 432 to the second housing 434.

The second frame 442 is attached to the first housing 432 and the second housing 434. The second frame 442 includes a second frame first elongate member 472, a second frame second elongate member 474, a second frame third elongate member 476, a second frame fourth elongate member 478, a second frame first magnet 480, and a second frame second magnet 482.

The second frame first elongate member 472 is attached to the first housing 432 and the second frame second elongate member 474 is attached to the second housing 434. The second frame third elongate member 476 extends from the second frame first elongate member 472 to the second frame second elongate member 474. The second frame fourth elongate member 478 extends from the second frame first elongate member 472 to the second frame second elongate member 474. In alternative embodiments, the second frame 442 can include either only a third frame elongate member or a fourth frame elongate member. However, having both a third frame elongate member and a fourth frame elongate member provides additional support to a second frame. In the illustrated embodiment, the second frame 442 is configured to be removed (e.g., releasably attached to the first housing 432 and the second housing 434) so that other types of signs can be installed with the sign installation tool, for example the sign installation tools described herein. However, in alternative embodiments, a second frame can be permanently attached to a first housing and/or a second housing, or releasably attached to a first housing or a second housing. In the illustrated embodiment, the second frame 442 is a rectangular shaped frame. However, in alternative embodiments, a second frame can be any suitable shape.

Each of the second frame first magnet 480 and the second frame second magnet 482 is attached to the second frame 442. In the illustrated embodiment, each of the second frame first magnet 480 and the second frame second magnet 482 is attached to the fourth frame elongate member 478. Specifically, the second frame first magnet 480 and the second frame second magnet 482 are attached to a first surface 484 of the fourth frame elongate member 478. In alternative embodiments, there may only be a singular frame magnet or zero frame magnets. However, it is beneficial to have at least one frame magnet at least because the inclusion of a frame magnet assists with retaining a sign in position during installation. It is particularly advantageous to have two frame magnets because having two frame magnets maintains balance between two sides of a sign during installation. In the illustrated embodiment, the second frame first magnet 480 and second frame second magnet 482 are disposed on a first hypothetical plane 481. The second frame first magnet 480 and the second frame second magnet 482 are separated by a first distance 483 that extends between the second frame first magnet 480 and the second frame second magnet 482.

In the illustrated embodiment, the bracket 443 includes a first bracket magnet 470, a second bracket magnet 471, and defines a first recess 486, a projection 488, a front surface 490, a back surface 492, a second recess 494, a third recess 496, a fourth recess 498, and a fifth recess 499.

The bracket 443 is attached to the second frame 442 and has a length 445. Specifically, in the illustrated embodiment, the bracket 443 is attached to the third frame elongate member 476. The first recess 486 extends along a portion of a length of the bracket 443 and into the projection 488. Each of the first recess 486, the second recess 494, the third recess 496, the fourth recess 498, and fifth recess 499 extends from the front surface 490, toward the back surface 492, to the first recess 486, and are configured to retain a bar of a sign (e.g., relatively vertical) during installation of the sign.

Although the illustrated embodiment includes two bracket magnets, in alternative embodiments there may be any suitable number of magnets including, but not limited to zero, one, two, a plurality, three, four, five, more than five, and any other number considered suitable for a particular embodiment. Having at least two bracket magnets is beneficial at least because it provides balance between two sides of a sign during installation. In the illustrated embodiment, the first bracket magnet 470 and the second bracket magnet 471 are disposed within the first recess 486 of the bracket 443 and contact a horizontal bar 475 of a sign such that the horizontal bar is disposed within the bracket 443 and the sign is releasably attached to the installation assembly 404. In the illustrated embodiment, the first bracket magnet 470 and the second bracket magnet 471 are separated by a second distance 473 and are disposed on a second hypothetical plane 485 that is relatively perpendicular to the first hypothetical plane 481. In the illustrated embodiment, the second distance 473 is less than the first distance 483. However, in alternative embodiments, the first distance can be the same as the second distance or the first distance can be less than the second distance.

Various methods of installing a sign into a surface (e.g., ground) using a sign installation tool, such as an embodiment described herein, are described herein. While these methods are described as a series of actions, it is to be understood and appreciated that the methods are not limited by the order of acts, as some acts may, in accordance with these methods, occur in the order described, in different orders, concurrently with other acts described herein, and/or omitted.

A step includes positioning a sign having a sign first elongate member and a sign second elongate member into a sign installation tool. Another step includes placing the sign installation tool at a desired location on a surface (e.g., the ground). Another step includes applying force on a step, of the sign installation tool, directed toward the surface to move an installation assembly, of the sign installation tool, from a first position to a second position. Another step includes removing the sign installation tool from the sign.

Those with ordinary skill in the art will appreciate that various modifications and alternatives for the described and illustrated examples can be developed in light of the overall teachings of the disclosure, and that the various elements and features of one example described and illustrated herein can be combined with various elements and features of another example without departing from the scope of the invention. Accordingly, the particular examples disclosed herein have been selected by the inventor(s) simply to describe and illustrate examples of the invention and are not intended to limit the scope of the invention or its protection, which is to be given the full breadth of the appended claims and any and all equivalents thereof.

What is claimed is:

1. A sign installation tool, comprising:
- a first frame having a first elongate member and a second elongate member;
- an installation assembly moveable between a first position and a second position, the installation assembly having:
  - a first housing slidably disposed on the first elongate member;
  - a second housing slidably disposed the second elongate member a second frame attached to the first housing and the second housing;

a bracket attached to the second frame; and a first bracket magnet attached to the bracket.

2. The sign installation tool of claim 1, wherein the second frame has a second frame first elongate member attached to the first housing, a second frame second elongate member attached to the second housing, and a second frame third elongate member extending from the second frame first elongate member to the second frame second elongate member; and wherein the bracket is attached to the second frame third elongate member.

3. The sign installation tool of claim 2, further comprising a second frame fourth elongate member extending from the second frame first elongate member to the second frame second elongate member.

4. The sign installation tool of claim 3, further comprising a first frame magnet attached to the second frame fourth elongate member.

5. The sign installation tool of claim 4, further comprising a second bracket magnet attached to the bracket; and further comprising a second frame magnet attached to the second frame fourth elongate member.

6. The sign installation tool of claim 5, wherein the bracket defines a first recess;

wherein the first bracket magnet and the second bracket magnet are attached within the first recess;

wherein the second frame fourth elongate member has a first surface; and wherein the first frame magnet and the second frame magnet are attached to the first surface.

7. The sign installation tool of claim 6, wherein the first frame magnet and the second frame magnet are disposed on a first hypothetical plane; and wherein the first bracket magnet and the second bracket magnet are disposed on a second hypothetical plane that is disposed perpendicular to the first hypothetical plane.

8. The sign installation tool of claim 6, wherein the first frame magnet and the second frame magnet are separated by a first distance;

wherein the first bracket magnet and the second bracket magnet are separated by a second distance; and wherein the first distance is greater than the second distance.

9. The sign installation tool of claim 6, wherein the bracket defines a projection and a second recess; and wherein the second recess extends into the projection and to the first recess.

10. The sign installation tool of claim 9, wherein the bracket defines a third recess; and wherein the third recess extends into the projection and to the first recess.

11. The sign installation tool of claim 5, wherein the first bracket magnet, the second bracket magnet, the first frame magnet, and the second frame magnet are configured to secure a sign to said sign installation tool.

12. The sign installation tool of claim 2, wherein the bracket defines a first recess; and wherein the first bracket magnet is attached within the first recess.

13. The sign installation tool of claim 1, wherein the bracket defines a first recess;

wherein the bracket has a length; and wherein the first recess extends along a portion of the length of the bracket.

14. The sign installation tool of claim 13, wherein the bracket defines a projection; and wherein the first recess extends into the projection.

15. The sign installation tool of claim 1, wherein the bracket defines a projection, a first recess, a second recess, a third recess, a fourth recess, and a fifth recess, each of the first recess, the second recess, the third recess, and the fourth recess, and the fifth recess extending into the projection.

16. The sign installation tool of claim 15, wherein the bracket has a front surface and a back surface; and wherein each of the first recess, the second recess, the third recess, and the fourth recess extends from the front surface, toward the back surface, and to the first recess.

17. The sign installation tool of claim 1, wherein the second frame is releasably attached to the first housing and the second housing.

18. The sign installation tool of claim 1, further comprising a support member extending from the first housing to the second housing; and further comprising a step disposed on the support member.

19. A sign installation tool, comprising:

a first frame having a first elongate member and a second elongate member;

an installation assembly moveable between a first position and a second position, the installation assembly having:

a first housing slidably disposed on the first elongate member;

a second housing slidably disposed the second elongate member a second frame releasably attached to the first housing and the second housing, the second frame having a second frame first elongate member attached to the first housing, a second frame second elongate member attached to the second housing, and a second frame third elongate member extending from the second frame first elongate member to the second frame second elongate member;

a bracket attached to the second frame third elongate member; and a first bracket magnet attached to the bracket.

20. A sign installation tool, comprising:

a first frame having a first elongate member and a second elongate member;

an installation assembly moveable between a first position and a second position, the installation assembly having:

a first housing slidably disposed on the first elongate member;

a second housing slidably disposed the second elongate member a second frame releasably attached to the first housing and the second housing, the second frame having a second frame first elongate member attached to the first housing, a second frame second elongate member attached to the second housing, a second frame third elongate member extending from the second frame first elongate member to the second frame second elongate member, and a second frame fourth elongate member extending from the second frame first elongate member to the second frame second elongate member;

a bracket attached to the second frame third elongate member;

a first bracket magnet attached to the bracket;

a second bracket magnet attached to the bracket;

a first frame magnet attached to the second frame fourth elongate member; and a second frame magnet attached to the second frame fourth elongate member.

* * * * *